United States Patent [19]

Shih

[11] Patent Number: 5,065,982

[45] Date of Patent: Nov. 19, 1991

[54] PUSH-BUTTON TYPE CONTROLLING-WATER DEVICE

[76] Inventor: Sen-Tein Shih, No. 41, Yi-Ya Lane, Sio-Sue Hsiang, Chang-hua Hsien, Taiwan

[21] Appl. No.: 603,073

[22] Filed: Oct. 25, 1990

[51] Int. Cl.⁵ .............................................. F16K 31/44
[52] U.S. Cl. ...................................... 251/320; 251/321
[58] Field of Search ................................. 251/320, 321

[56]     References Cited
        U.S. PATENT DOCUMENTS 690,011  12/1901  Blake ..................................... 251/320

Primary Examiner—Gerald A. Michalsky
Attorney, Agent, or Firm—Browdy and Neimark

[57]     ABSTRACT

A push-button type water-controlling device having a press control rod having a cylindrical button on the top and a rectangular rod portion with a rectangular leading groove; a heart-shaped positioning groove; a fixed base, an upper fixed cover having a round hole; and a rectilinear hole; a positioning member entering into the round hole and into the rectangular leading groove at one end, and encasing to the rectangular hole and the heart-shaped positioning groove at the other end; and a spring mounted between the cylinder button and the fixed base is shown and described.

2 Claims, 2 Drawing Sheets

PUSH-BUTTON TYPE CONTROLLING-WATER DEVICE

BACKGROUND OF THE INVENTION

1. Field of the Invention

The present invention relates to a water faucet, and more particularly to a push-button type water-controlling device.

2. The Prior Art

Traditional watering equipment, which uses an added running-type switch valve, can control turning "on" and "off" a water supply. The faucet operates by hand, making full use of loosening and tightening in order to control water flow.

The traditional faucet suffers from the following disadvantages:

(1) It is inconvenient and it wastes time in completing the operation of revolving a valve.
(2) It is easy to cause leak when the faucet user turns it off with carelessness or in a hurry.
(3) It is also easy to destroy the revolving valve rubber washer which is vulnerable and easily causes leaks whenever the user violently operates it. The rate of breakdown is high as compared to this invention.

SUMMARY OF THE INVENTION

It is therefore an object of the present invention to provide a push-button type water-controlling device for controlling water flow on and off by means of a simple, easy to operate, and effortless push-button water-controlling device. This device also provides fast and facile results.

It is a further object of the present invention to provide a push-button water-control device for ensuring stopping the water completely after pushing, and for avoiding leaking. The user does not need to worry about leaking and thus feel secure after using it.

An additional object is to provide a push-button type water-control device for saving time and labor. A press-button is operated by hand only, and the valve is unable to cause damage by violently revolving the faucet top. This valve also lengthens the time of use.

According to the present invention a push-button water-controlling device includes a press control rod having a cylinder button of the top connected to a rectangular rod portion, a rectangular leading groove in said rod, a heart-shaped positioning groove and a heart-shaped positioning piece, and a rectangular convex piece extending downward; a fixed base having a half-circle cross section with a small leading concave groove in the middle; an upper fixed cover having a round hole and a rectilinear hole, and having a half-circle shield; a positioning member entering into the round hole of the upper fixed cover and into the rectangular leading groove for the press control rod at one side, and entering into the rectilinear hole and the heart-shaped positioning groove at the other side; and a spring mounted between the cylinder button of the press control rod and the fixed base.

Still further objects of the present invention will be evident from the detailed description and claims when read in conjunction with the accompanying drawings.

DETAILED DESCRIPTION OF THE PREFERRED EMBODIMENT

Figure 1:
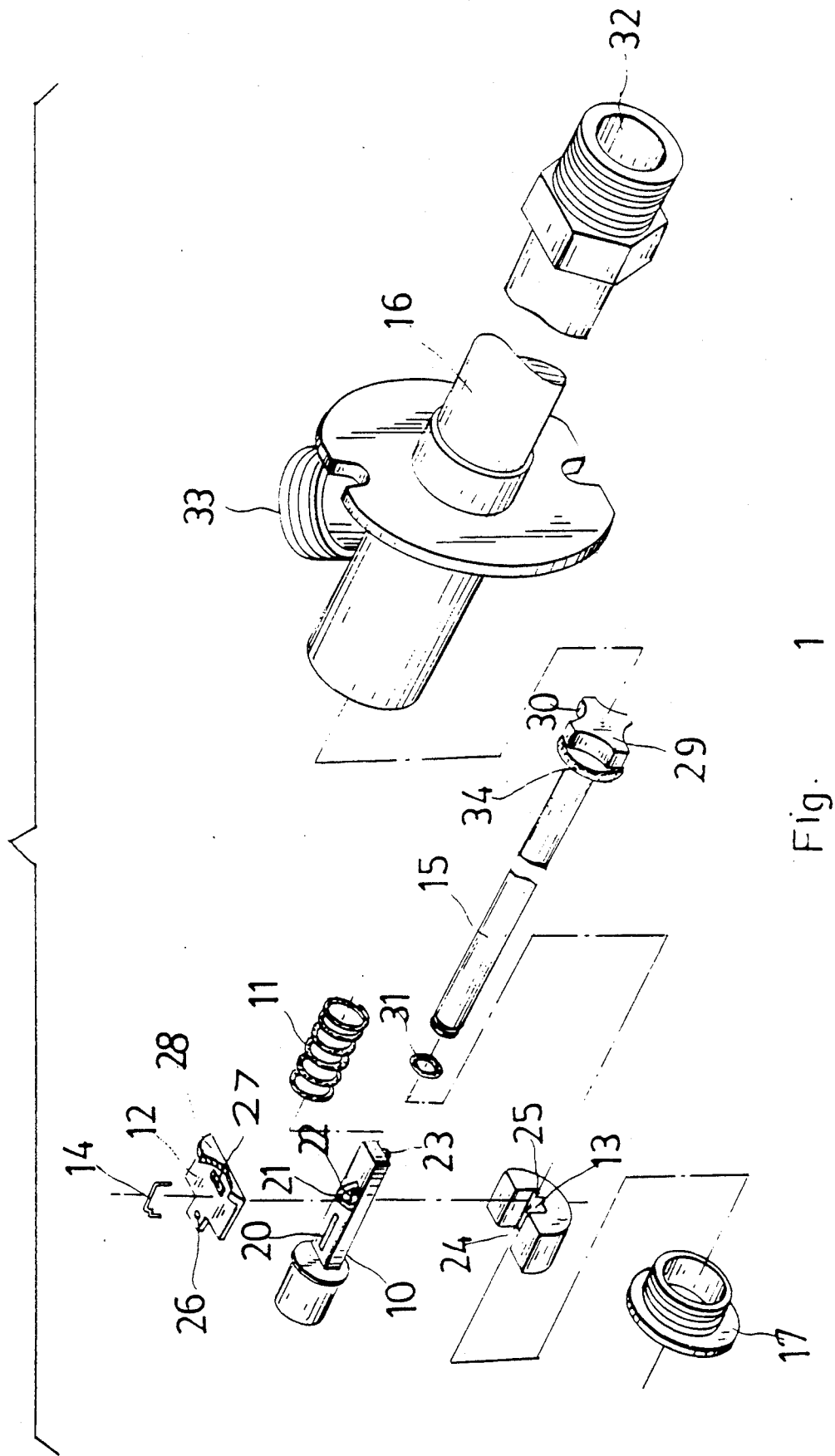
FIG. 1 is an exploded view according to the present invention.
Figure 2:
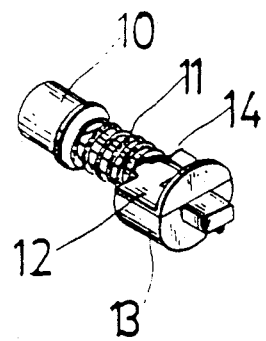
FIG. 2 is an assembled perspective view of FIG. 1.

Referring now to FIGS. 1 and 2, there is shown a preferred embodiment of a push-button type valve according to the present invention. The valve includes a press control rod 10, a fixed base 13, an upper fixed cover 12, a positioning member 14, a water-control rod 15, and a water-supply member 16.

Press control rod 10 has a cylindrical push-button on the end, a rectangular rod portion with a rectangular leading groove 20, a heart-shaped positioning groove 21, and a heart-shaped positioning piece 22, and a rectangular piece 23 extending downward.

Fixed base 13 has a semi-circular cross section with a groove 24 in the middle. The groove 24 also has a small downwardly extending groove 25.

Upper fixed cover 12 has a round a round hole 26, a rectilinear hole 27, and a half-circled shield 28.

Control rod 15 ends with a ring piece 29. Ring piece 29 has an arc-shaped groove 30. On both sides of control rod 15 are mounted lead-proof packing rings 31 and 34.

Water-supply member 16 has a water input 32 and an exit 33.

The rectangular rod portion of press control rod 10 fits into concave groove 24 extending upward in fixed base 13. The rectangular protruding piece 23 fits into the small groove 25 in base 13. Press control rod 10 moves back and forth on fixed base 13. The upper portion of fixed base 13 combined with upper fixed cover 12 to form a round face. The round face is formed as the half circle shield 28 and the half circle part of fixed base 13. One end of positioning member 14 is inserted into round hole 26 and the rectangular leading groove 20. The other end of positioning member 14 enters into rectilinear 27 and heart-shaped positioning groove 21. A spring 11 is compressed between the cylinder button of press control rod 10 and fixed base 13.

Figure 3:
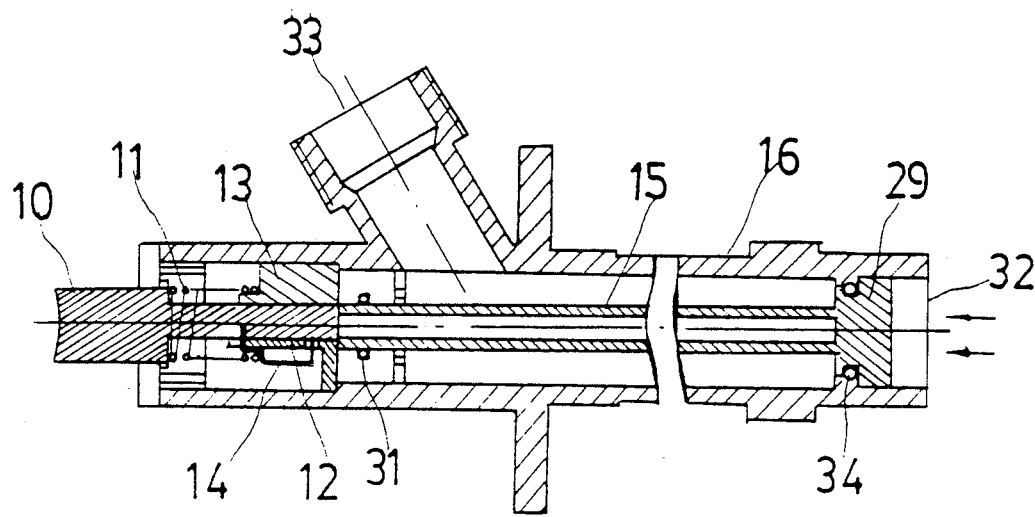
FIG. 3 is a schematic view showing the valve when water flow is stopped and
FIG. 4 is a schematic view showing the valve when water is flowing.
Figure 4:
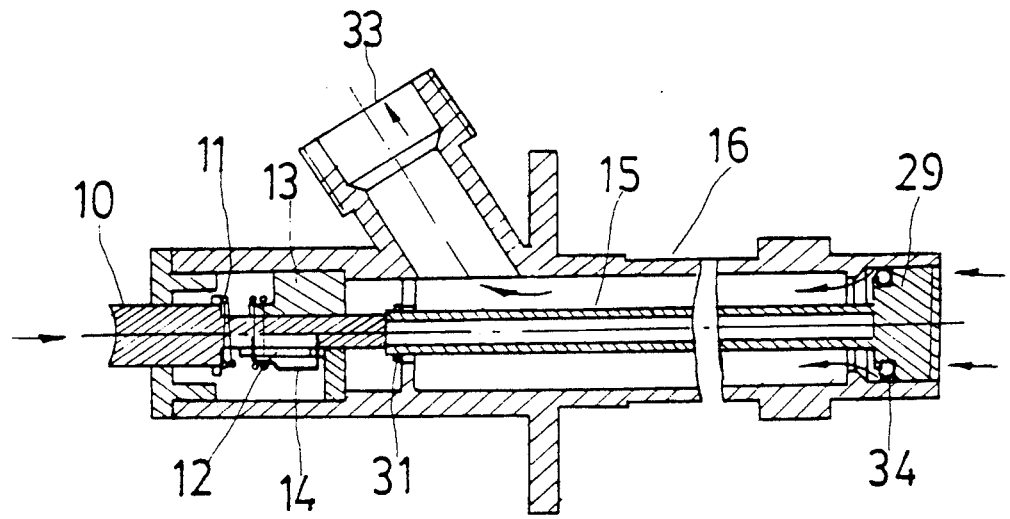

Assembly is by inserting control rod 15 into water-supplying member 16, mounting the push-button control equipment (10, 20, 13, 11, 12), and then locking the control equipment in place with a cover element 17. FIG. 3 shows a schematic view when the water is off. If water is needed, the user may press the cylinder button of press control rod 10 (as shown in FIG. 4). Wherever press control rod 10 moves forwardly, it pushes control rod 15 forward. This opens the closed top (seal 34, FIGS. 3 an 4), and water enters into water-supplying member 16 by means of arc-shaped groove formed at 34. The water flows out from exit 33. When spring 11 is compressed by pressing the button, one end of positioning member 14 is moved onto the heart-shaped fixed groove 21. Both operations cause water to be supplied.

To turn the water off, the operator presses control rod 10 lightly. This causes one end of positioning member 14 to move downward along heart-shaped fixed groove 21 and into the end of the groove. The press control rod 10 will return to its original place by the compression force of spring 11. Simultaneously, control rod 15 will return to the water off position under the force of the water pressure at entrance 32.

The user will turn the water in supply 16 off and on by an easy pressing operation. The present invention not only can be operated easily, time-saving and effectlessly, but it also achieves the complete function of controlled water supply. The invention avoids leaking and breakdown which occurs in the traditional revolving combination.

While a preferred embodiment of the invention has been shown and described, it will be apparent to those skilled in the art that changes can be made in this embodiment without departing from the principles and spirit of the invention, the scope of which is defined in the appended claims.

What I claimed is:

1. A push-button water control device comprising:
   a press control rod having a cylindrical button on the end and a rectangular rod portion with a rectangular leading groove, a heart-shaped positioning groove and a heart-shaped positioning piece, and a rectangular piece extending downward;
   a fixed base having a semicircular cross section with a small leading concave groove in the middle;
   an upper fixed cover having a round hole and a rectilinear and a semicircular circled shield;
   a positioning member inserted into said round hold and into said rectangular leading groove, and entering into said rectilinear hole and said heart-shaped positional groove at the other end; and
   a spring mounted between said cylinder button and said fixed base.

2. A push-button type water-controlling device as claimed in claim 1 wherein said fixed base is combined with said upper fixed cover to form a round face by the combination of said semi-circular circled shield and said semicircular fixed base.

* * * * *